United States Patent
Rusch (10) Patent No.: US 11,885,350 B2
(45) Date of Patent: Jan. 30, 2024

(54) OUTFLOW REGION OF A COMPRESSOR, COMPRESSOR HAVING AN OUTFLOW REGION OF SAID TYPE, AND TURBOCHARGER HAVING THE COMPRESSOR

(71) Applicant: TURBO SYSTEMS SWITZERLAND LTD., Baden (CH)

(72) Inventor: Daniel Rusch, Wettingen (CH)

(73) Assignee: Turbo Systems Switzerland Ltd., Baden (CH)

( * ) Notice: Subject to any disclaimer, the term of this patent is extended or adjusted under 35 U.S.C. 154(b) by 0 days.

(21) Appl. No.: 17/791,331

(22) PCT Filed: Jan. 7, 2021

(86) PCT No.: PCT/EP2021/050171
§ 371 (c)(1),
(2) Date: Jul. 7, 2022

(87) PCT Pub. No.: WO2021/140142
PCT Pub. Date: Jul. 15, 2021

(65) Prior Publication Data
US 2023/0349392 A1    Nov. 2, 2023

(30) Foreign Application Priority Data
Jan. 7, 2020   (EP) ..................... 20150566

(51) Int. Cl.
*F04D 29/42*   (2006.01)
*F04D 29/44*   (2006.01)
*F02B 37/00*   (2006.01)

(52) U.S. Cl.
CPC ....... *F04D 29/444* (2013.01); *F04D 29/4293* (2013.01); *F02B 37/00* (2013.01)

(58) Field of Classification Search
CPC .......................... F04D 29/4293; F04D 29/444
See application file for complete search history.

(56) References Cited

U.S. PATENT DOCUMENTS 3,289,921 A     12/1966  Soo
3,997,281 A  *  12/1976  Atkinson ............... F04D 29/444
                                                      415/207
(Continued)

FOREIGN PATENT DOCUMENTS

DE           724553 C  *  8/1942
DE    102014012765 A1    3/2016
(Continued)

OTHER PUBLICATIONS

European Search Report in European Application No. 20150566.6, dated Jul. 1, 2020, 6 pages.
(Continued)

*Primary Examiner* — Christopher R Legendre
(74) *Attorney, Agent, or Firm* — Meunier Carlin & Curfman LLC (57) ABSTRACT

An outflow region of a compressor. The outflow region comprises a flow channel delimited by a side wall at a shroud side and a side wall at a hub side. The side wall at the hub side has, in a region of the compressor wheel outlet, a contour configured such that, in a flow direction, the cross-sectional areas of the flow channel decrease, pass through a minimum and increase again. In the region of the compressor wheel outlet, the flow channel has a length L which extends from a compressor wheel outlet edge to a diffuser blade inlet edge of a diffuser region. The diffuser region adjoins the region of the compressor wheel outlet and has multiple diffuser blades. A compressor with the outflow region according to the invention, and to a turbocharger having the compressor.

15 Claims, 5 Drawing Sheets

(56) References Cited

U.S. PATENT DOCUMENTS

| 9,874,224 B2* | 1/2018 | Morita | F04D 17/10 |
| 11,408,439 B2* | 8/2022 | Higashimori | F04D 29/441 |
| 2010/0129209 A1* | 5/2010 | Sugimoto | F04D 29/441 |
| | | | 415/203 |

FOREIGN PATENT DOCUMENTS

| DE | 102015103615 A1 | 4/2016 |
| EP | 3564537 A1 | 11/2019 |

OTHER PUBLICATIONS

English Translation of the International Search Report in International Application No. PCT/EP2021/050171, dated Apr. 14, 2021, 2 pages.

* cited by examiner

OUTFLOW REGION OF A COMPRESSOR, COMPRESSOR HAVING AN OUTFLOW REGION OF SAID TYPE, AND TURBOCHARGER HAVING THE COMPRESSOR

CROSS REFERENCE TO RELATED APPLICATIONS

This application is a United States National Phase Patent Application of International Patent Application Number PCT/EP2021/050171, filed on Jan. 7, 2021, which claims the benefit of priority to EP Application No. 20150566.6, filed Jan. 7, 2020.

TECHNICAL FIELD

The invention relates to the field of compressors, in particular radial compressors and diagonal compressors. In particular, the invention relates to an outflow region downstream of a compressor wheel and upstream of a diffuser region of such a compressor.

TECHNICAL BACKGROUND

Exhaust turbochargers are nowadays used as standard for increasing the power of internal combustion engines, having a turbine in the exhaust tract of the internal combustion engine and having a compressor upstream of the internal combustion engine. Here, the exhaust gases of the internal combustion engine are expanded in the turbine. The work thus obtained is transferred by means of a shaft to the compressor, which compresses the air fed to the internal combustion engine. By using the energy of the exhaust gases to compress the air fed to the combustion process in the internal combustion engine, it is possible to optimize the combustion process and the efficiency of the internal combustion engine.

Compressors, in particular radial or diagonal compressors, with high-displacement compressor wheels have high ratios of the compressor wheel inlet radius $R_1$ to the compressor wheel outlet radius $R_2$, for example $R_1/R_2>0.75$. Typically, the flow is deflected in the radial direction in the impeller region or in the impeller and diffuser region, respectively, which leads to a large flow deflection and a large curvature of the shroud contour.

Furthermore, high pressure ratios are typically also required, and therefore the compressor wheel hub design should preferably be designed to be slim in order to keep the centrifugal load below the mechanical material limits. A hub of slender design typically leads to a small exit angle of the compressor wheel hub contour (measured with respect to the radial).

If the meridional channel in the diffuser is of conventional design (e.g. purely radially at the hub and with pinch (curvature continuous) at the shroud), this initially leads to pronounced tapering of the flow cross section downstream of the compressor wheel outlet. This typically leads to an increase in the Mach number at the inlet to the diffuser, in particular at the leading edges of the diffuser vanes. In order to avoid this, the diffuser, in particular the diffuser vanes, can be arranged further downstream. Another remedy known from the prior art is, for example, a channel recess on the hub contour. However, it has been found that the known solutions have certain disadvantages with regard to the efficiency, the overall volume and the costs of the compressor.

BRIEF DESCRIPTION OF THE INVENTION

It is the object of the present invention to provide an outflow region of a compressor, a compressor and a turbocharger which is improved at least with regard to one of the disadvantages known from the prior art.

To achieve the abovementioned objects, an outflow region of a compressor, in particular of a radial compressor or diagonal compressor, as described herein is provided. Furthermore, a compressor having an outflow region according to the embodiments described herein and a turbocharger having such a compressor are provided.

Further aspects, advantages and features of the present invention can be found in the description and the accompanying figures.

According to one aspect of the invention, an outflow region of a compressor, in particular of a radial compressor or diagonal compressor, is provided. The outflow region comprises a flow channel which is delimited by a shroud-side side wall and a hub-side side wall: In a region of the compressor wheel outlet, the hub-side side wall has a contour which is designed in such a way that, in a flow direction, the cross-sectional areas of the flow channel decrease, pass through a minimum and increase again. In the region of the compressor wheel outlet, the flow channel has a length L which extends from a compressor wheel outlet edge to a diffuser vane inlet edge of a diffuser region. The diffuser region adjoins the region of the compressor wheel outlet and has a multiplicity of diffuser vanes.

Thus, an outflow region is advantageously provided which is improved over the prior art. In particular, the variability of the hub-side side wall contour makes it possible to achieve an advantageous cross-sectional profile (decrease-minimum-increase) of the flow channel, thus enabling the flow upstream of a diffuser region to be slowed to a greater extent without the flow being detached on the shroud side. Advantageously, the curvature on the shroud can first be checked and then the cross-sectional area profile can be adjusted via the hub contour (contour of the hub-side side wall). This leads to a more compact design and to higher efficiencies. The risk of flow separation can thus be reduced by the outflow region according to the invention, which has an advantageous effect on the efficiency of the compressor. In particular, the outflow region according to the invention advantageously makes it possible for the compressor wheel outlet flow to be greatly decelerated and made more uniform within a compact installation space without the flow having a tendency for premature separation/instability during throttling.

According to a second aspect of the invention, a compressor, in particular a radial compressor or a diagonal compressor, is provided which comprises a compressor wheel and an outflow region according to the embodiments described herein. Thus, a compressor having improved efficiency can advantageously be provided.

According to a third aspect of the invention, a turbocharger having a compressor according to the embodiments described herein is provided, so that a turbocharger is advantageously provided which is improved over the prior art.

BRIEF DESCRIPTION OF THE FIGURES

The invention will be explained below with reference to exemplary embodiments, which are illustrated in figures and from which further advantages and modifications can be derived. In this case:

FIGS. 2 to 5 show schematic views of an outflow region of a compressor according to further embodiments described herein, wherein FIGS. 2 and 5 show a diagonal compressor and FIGS. 3 and 4 show a radial compressor.

DETAILED DESCRIPTION OF THE FIGURES

An outflow region 10 of a compressor 20 and a compressor 20 according to the present disclosure are described with reference to FIGS. 1 to 5. The compressor can be a radial compressor or a diagonal compressor.

According to one embodiment, which can be combined with other embodiments described herein, the outflow region 10 comprises a flow channel 11, which is delimited by a shroud-side side wall 12 and a hub-side side wall 13. In a region 14 of the compressor wheel outlet, the hub-side side wall 13 has a contour which is designed in such a way that, in flow direction 1, the cross-sectional areas, in particular the meridional cross-sectional areas, of the flow channel decrease, pass through a minimum and increase again. In other words, the hub-side side wall 13 is designed in such a way that, in the flow direction 1, the flow cross section of the flow channel 11 tapers, passes through a minimum and widens again before entry into a diffuser region 16. In particular, the contour profile of the hub-side side wall 13 is designed in such a way that, in the flow direction 1, the distance from the opposite shroud-side side wall 12 decreases, passes through a minimum and then increases again. In the region 14 of the compressor wheel outlet, the flow channel 11 has a length L as shown in FIGS. 1 to 5. The length L of the flow channel 11 extends from a compressor wheel outlet edge 4 to an inlet 5 into the diffuser region 16, in particular as far as a diffuser vane inlet edge of the diffuser region 16. The diffuser region 16 adjoins the region 14 of the compressor wheel outlet and has a multiplicity of diffuser vanes 17.

The flow downstream of the compressor wheel can thus first be made more uniform, then decelerated to a greater extent and a risk of flow separation can be reduced, which has an advantageous effect on the efficiency, the overall volume and the costs of the compressor.

Figure 4:
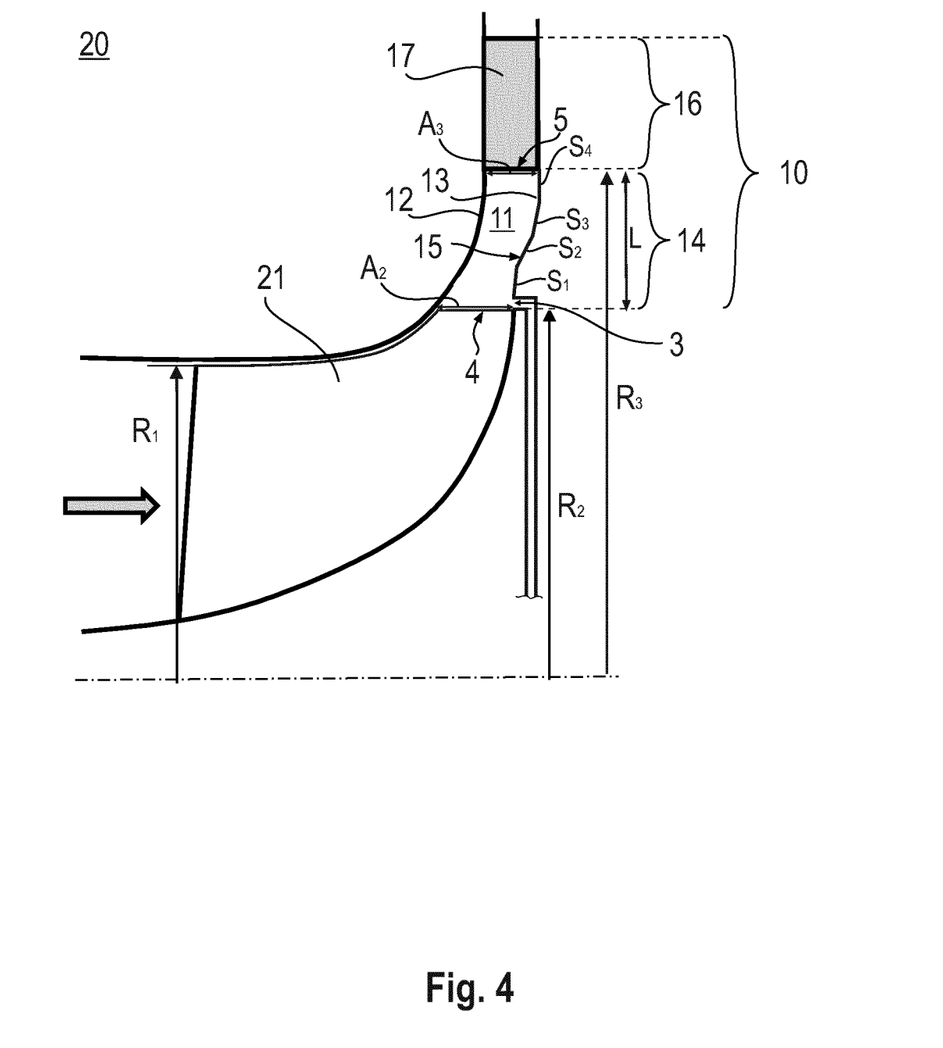

According to one embodiment, which can be combined with other embodiments described herein, the contour of the hub-side side wall 13 has an S-shaped region 15. In particular, the contour of the hub-side side wall has an S-shaped meridional contour profile between the compressor wheel outlet and the diffuser inlet. The S-shaped region 15 can be formed, for example, by at least three segments $S_1$, $S_2$ and $S_3$, as is illustrated by way of example in FIG. 3. FIG. 4 shows an exemplary embodiment with four segments $S_1$, $S_2$, $S_3$ and $S_4$. The segments can be line segments and/or curve segments. It should thus be understood that the S-shaped region 15 can be provided by a polygonal S contour. Alternatively, the S-shaped region 15 can also have a continuous contour profile. The profile of the contour can be tangent continuous or non-tangent continuous. For example, the S-shaped region 15 can have a right-hand curvature and a left-hand curvature in the flow direction, as illustrated by way of example in FIGS. 1, 2 and 5. In other words, the S-shaped region 15 can have a convex curvature facing the shroud-side side wall 12 and a concave curvature. In particular, downstream of the compressor wheel outlet in the flow direction, the S-shaped region 15 has first of all a convex curvature facing the shroud-side side wall 12 and then a concave curvature facing the shroud-side side wall 12. The shroud-side side wall 12 is typically designed to be exclusively convex relative to the hub-side side wall 13 in the region of the compressor wheel outlet. In particular, relative to the hub-side side wall 13, the shroud-side side wall 12 is designed to be exclusively convex from the compressor wheel outlet to the inlet into the diffuser region.

Figure 1:
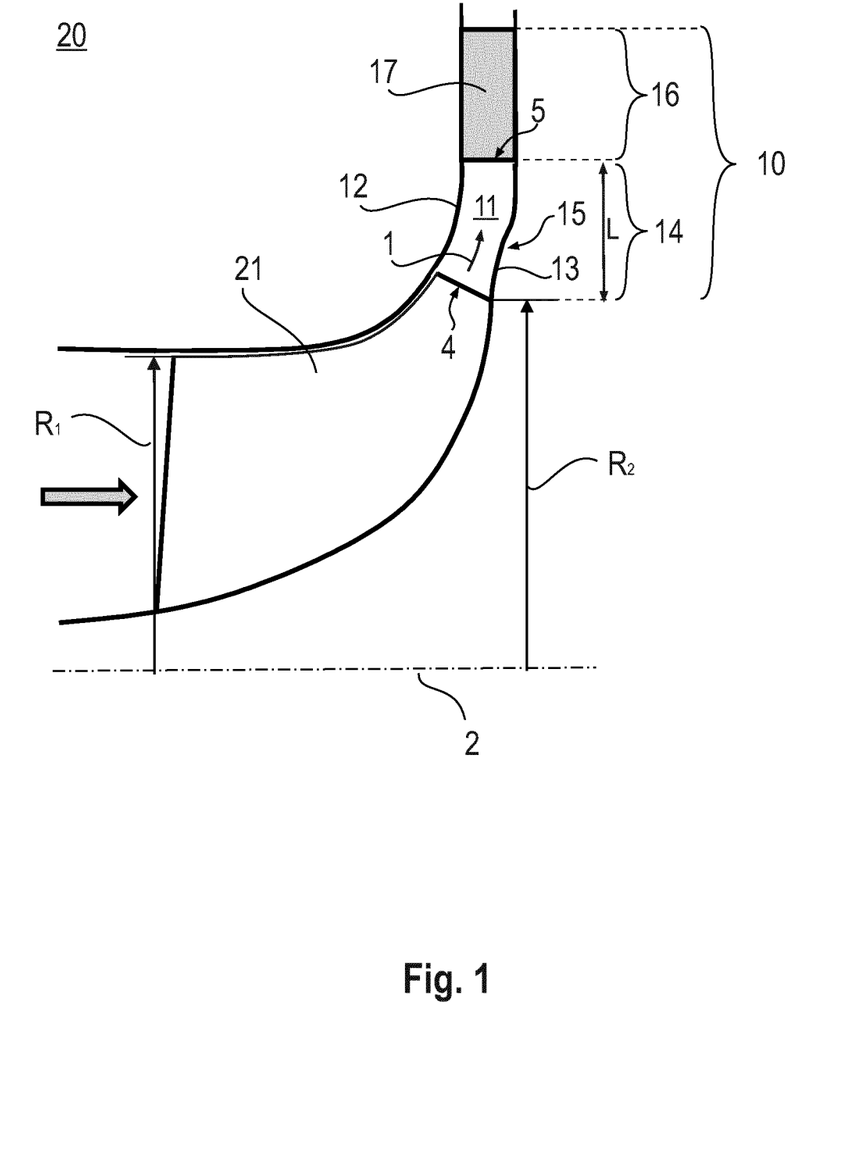
FIG. 1 shows a schematic view of an outflow region of a compressor, in particular of a diagonal compressor, according to embodiments described herein.
Figure 2:
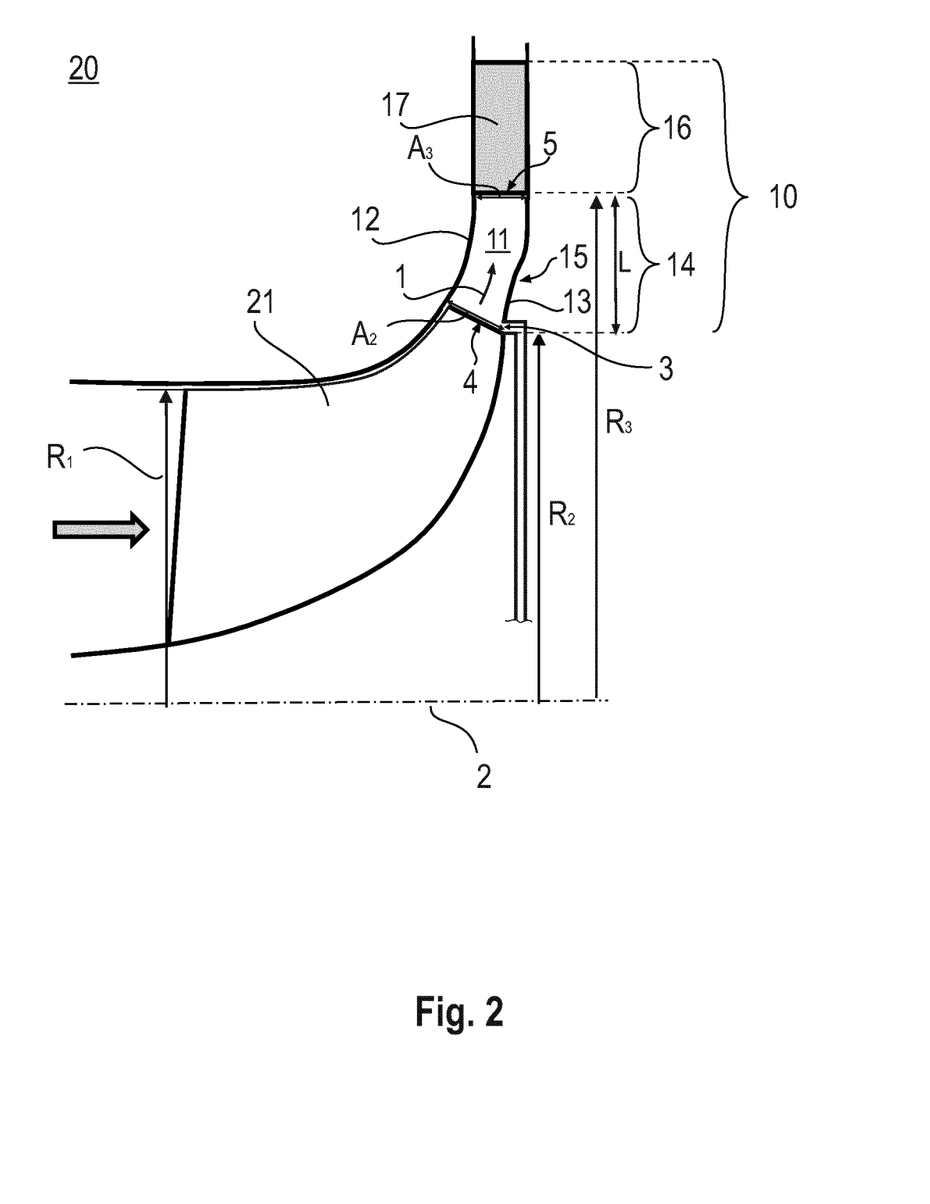
Figure 3:
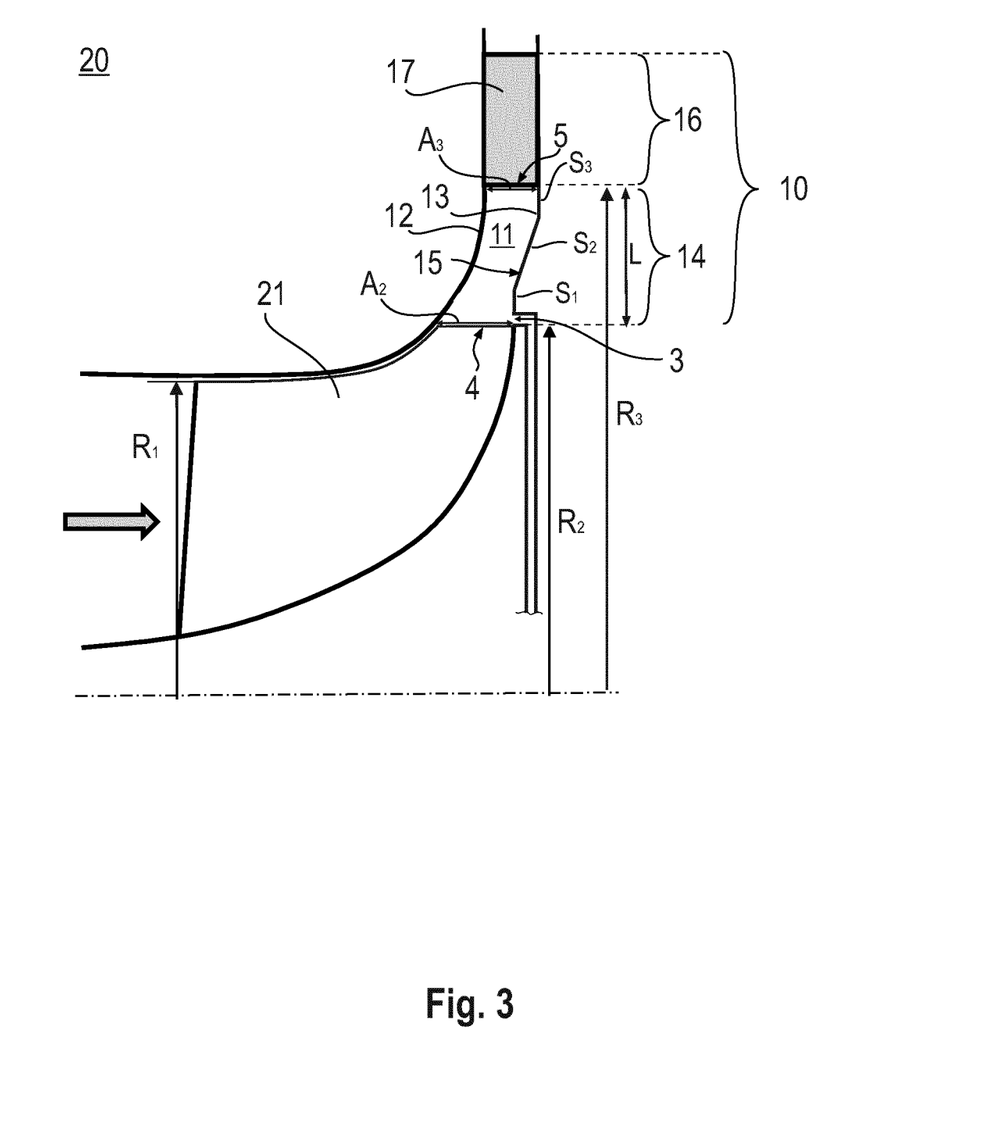
Figure 5:
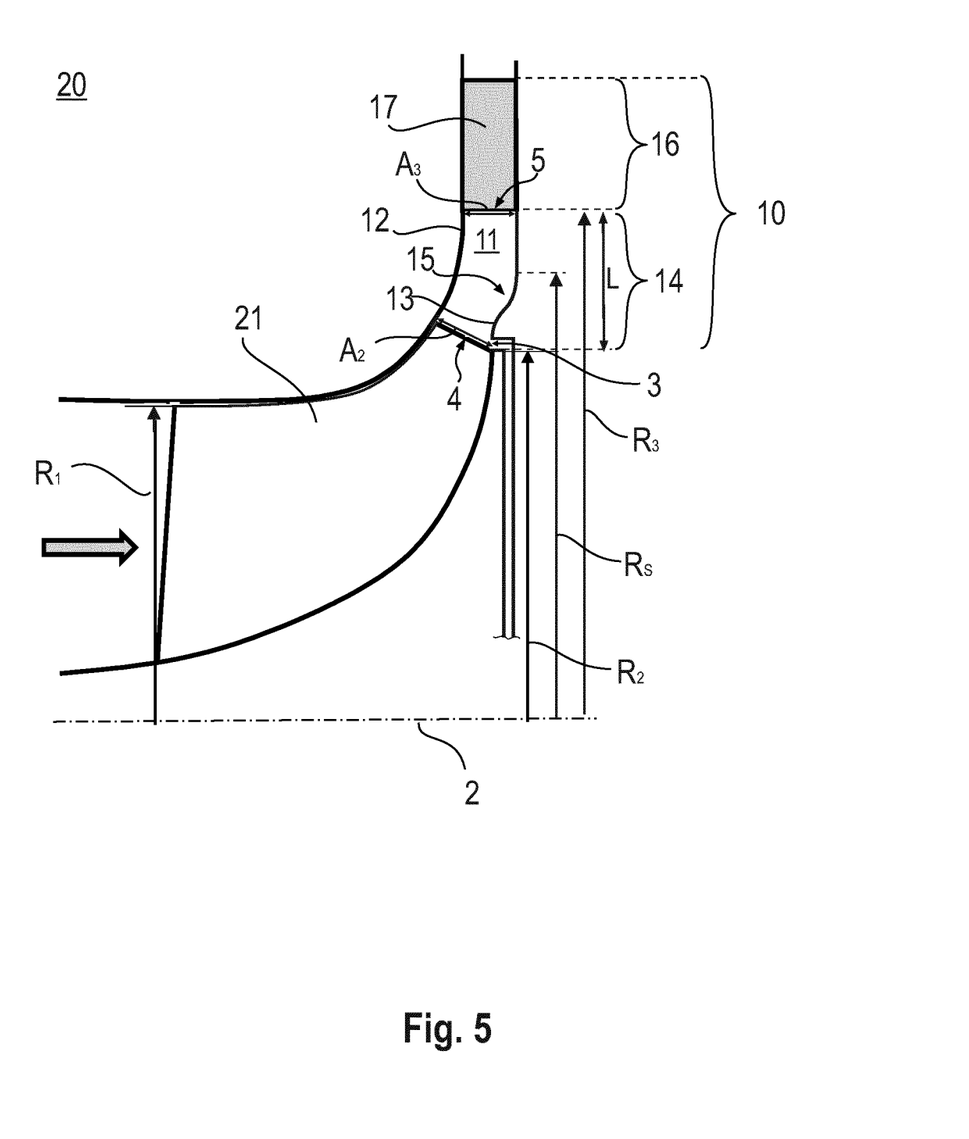

According to one embodiment, which can be combined with other embodiments described herein, the hub-side side wall 13 has a continuous contour profile in the region 14 of the compressor wheel outlet, as is illustrated by way of example in FIGS. 1, 2 and 5. As an alternative or in addition, the shroud-side side wall 12 can have a continuous contour profile in the region 14 of the compressor wheel outlet, as shown in FIGS. 1 to 5. The shroud-side side wall 12 is typically curved to the left in the flow direction 1.

According to one embodiment, which can be combined with other embodiments described herein, the S-shaped region 15 is arranged closer to the compressor wheel outlet edge 4 than to the inlet 5 of the diffuser region. For example, the S-shaped region 15 can be arranged within 50% of the length L of the flow channel 11 downstream of the compressor wheel outlet edge. Typically, the change of curvature of the hub-side side wall 13 provided by the S shape is arranged closer to the compressor wheel outlet edge 4 than to the inlet 5 of the diffuser region. The location of the change of curvature is the turning point at which a convex curvature of the hub-side side wall 13 facing the shroud-side side wall 12 merges into a concave curvature of the hub-side side wall 13 facing the shroud-side side wall 12. In particular, the location of the change in curvature is the location at which the curvature undergoes a change in sign. In particular, the flow cross section minimum, which is formed by the S-shaped region 15 of the flow channel 11, can be arranged within 50% of the length L of the flow channel 11 downstream of the compressor wheel outlet edge. In other words, the flow cross-section minimum is typically arranged closer to the compressor wheel outlet edge 4 than to the inlet 5 of the diffuser region.

According to one embodiment, which can be combined with other embodiments described herein, the flow channel 11 has a compressor wheel outlet cross-sectional area $A_2$ and a diffuser inlet cross-sectional area $A_3$, wherein a ratio $A_3/A_2$ is selected from a range of $0.80 \leq A_3/A_2 \leq 1.2$, in particular from a range of $0.90 \leq A_3/A_2 \leq 1.1$. Typically, the compressor wheel outlet cross-sectional area $A_2$ is a cylindrical surface (with the compressor wheel outlet edge running parallel to the axis of rotation) or a conical lateral surface (with the compressor wheel outlet edge inclined relative to the axis of rotation) downstream of the compressor wheel outlet edge 4. The diffuser inlet cross-sectional surface $A_3$ can likewise be a cylindrical surface (with a diffuser inlet edge extending parallel to the axis of rotation) or a conical surface (with a diffuser inlet edge inclined relative to the axis of rotation). In this connection, it should be pointed out that the cross-sectional areas of the flow channel which decrease in the flow direction, pass through a minimum and increase again can be cylindrical areas and/or conical areas.

According to one embodiment, which can be combined with other embodiments described herein, as shown by way of example in FIGS. 2 to 5, a gap 3 (for example a leakage flow opening) can be formed in the hub-side side wall 13, in particular at the compressor wheel outlet.

According to one embodiment, which can be combined with other embodiments described herein, the minimum of the cross-sectional areas of the flow channel 11 in the flow direction lies at a radial position $r_{Min}$, which is selected from a range $R_2 < r_{Min} \leq R_2 + 0.8 \times (R_3 - R_2)$, in particular $R_2 < r_{Min} \leq R_2 + 0.6 \times (R_3 - R_2)$. $R_2$ is the compressor wheel outlet radius, $R_3$ is the radial distance of the inlet 5 into the diffuser region from the axis of rotation 2 of the compressor wheel 21.

According to one embodiment, which can be combined with other embodiments described herein, a ratio VQ of the minimum of the cross-sectional areas of the flow channel 11 to the compressor wheel outlet cross-sectional area $A_2$ is selected from a range $0.8 \leq VQ < 1$, in particular $0.9 \leq VQ < 1$.

According to one embodiment, which can be combined with other embodiments described herein, the S-shaped region 15 has a change in curvature from the convex curvature facing the shroud-side side wall 12 to the concave curvature facing the shroud-side side wall 12, which lies at a radial position $r_{KW}$ which is selected from a range $R_2 < r_{KW} \leq R_2 + 0.8 \times (R_3 - R_2)$, in particular $R_2 < r_{KW} \leq R_2 + 0.6 \times (R_3 - R_2)$. $R_2$ is the compressor wheel outlet radius and $R_3$ is the radial distance of the inlet 5 into the diffuser region from the axis of rotation 2 of the compressor wheel 21.

According to one embodiment, which can be combined with other embodiments described herein, the convex curvature has a maximum curvature at a radial position $r_{Kmax}$, which is selected from a range $R_2 < r_{Kmax} \leq R_2 + 0.75 \times (R_3 - R_2)$, in particular $R_2 < r_{Kmax} \leq R_2 + 0.5 \times (R_3 - R_2)$. The maximum curvature is to be understood to mean the greatest positive value of the curvature. According to one embodiment, which can be combined with other embodiments described herein, the concave curvature has a minimum curvature at a radial position $r_{Kmin}$, which is selected from a range $R_2 + 0.15 \times (R_3 - R_2) \leq r_{Kmin} < R_3$, in particular $R_2 + 0.25 \times (R_3 - R_2) \leq r_{Kmin} < R_3$. The minimum curvature is to be understood to mean the greatest negative value of the curvature. In this context, it is pointed out that, when $r_{Kmax}$ is selected from the range $R_2 < r_{Kmax} \leq R_2 + 0.75 \times (R_3 - R_2)$ and $r_{Kmin}$ from the range $R_2 + 0.15 \times (R_3 - R_2) \leq r_{Kmin} < R_3$, $r_{Kmax}$ and $r_{Kmin}$ are typically selected such that $r_{Kmax} < r_{Kmin}$.

It should be pointed out that in the present application the cross-sectional areas of the flow channel are the meridional cross-sectional areas of the flow channel, in particular the cross-sectional areas of the flow channel which extend in the normal direction to the main flow direction. The main flow direction runs along the center line between the shroud-side side wall 12 and the hub-side side wall 13.

According to another aspect of the present disclosure, a compressor 20, in particular a radial compressor or a diagonal compressor, is provided which comprises a compressor wheel 21 and an outflow region 10 according to the embodiments described herein.

According to one embodiment, which can be combined with other embodiments described herein, the compressor wheel 21 has a compressor wheel inlet radius $R_1$ and a compressor wheel outlet radius $R_2$. A ratio of the compressor wheel inlet radius $R_1$ to the compressor wheel outlet radius $R_2$ is typically selected from a range of $0.65 \leq R_1/R_2$, in particular from a range of $0.7 \leq R_1/R_2$.

According to one embodiment, which can be combined with other embodiments described herein, the compressor comprises a diffuser region 16, which is arranged at a radial distance $R_3$ from an axis of rotation 2 of the compressor wheel 21. Typically, a ratio of the radial distance $R_3$ to the compressor wheel outlet radius $R_2$ is selected from a range of $1.05 \leq R_3/R_2 \leq 1.30$, in particular from a range of $1.10 \leq R_3/R_2 \leq 1.25$.

According to one embodiment, which can be combined with other embodiments described herein, the contour of the hub-side side wall 13 comprises an S-shaped region 15 according to one of the embodiments described herein. As illustrated by way of example in FIG. 5, the S-shaped region 15 can have an end at a distance $R_S$ from the axis of rotation 2 of the compressor wheel 21 in the flow direction. In particular, the distance $R_S$, the compressor wheel outlet radius $R_2$ and the radial distance $R_3$ of the diffuser region 16 from the axis of rotation 2 of the compressor wheel 21 can be selected in such a way that the condition $0.4 \leq (R_S - R_2)/(R_3 - R_2) \leq 1.0$ is satisfied. In this connection, it should be noted that the end of the S-shaped region 15 is at the location at which the concave curvature facing the shroud-side side wall 12 returns to zero.

In the light of the present disclosure, it is thus possible, according to another aspect, to provide a turbocharger which comprises a compressor 20, in particular a radial compressor or a diagonal compressor, according to the embodiments described herein. In this context, it should be noted that the features described in connection with the exemplary embodiments of the radial compressor (FIGS. 2, 3 and 4) can also be transferred to the exemplary embodiments of the diagonal compressor (FIGS. 1 and 5) and vice versa.

The embodiments described herein are advantageous, in particular, for high-displacement radial or diagonal compressors. Compared with the prior art, the compressor wheel outflow can be advantageously guided, made more uniform and decelerated to a greater extent in a small installation space. If a guide vane array (diffuser vanes) is used in the diffuser, either the guide vanes can be moved closer to the impeller or the Mach number level at the diffuser vane inlet edges can be further reduced. Reducing the Mach number and making the diffuser vane flow more uniform lead to an increase in efficiency. Making the flow more uniform and the possibility of reducing the contour curvature on the shroud side lead to stability improvements. By reducing the installation space, the production costs and the costs of the product can be reduced.

In other words, the embodiments described herein may have the following advantages. Continuous, in particular tangent continuous, as well as non-continuous, in particular non-tangent continuous, hub contour profiles are possible, which reduce the risk of flow separation and are advantageous in terms of efficiency. The shroud contour curvature in the meridional view can be reduced without excessively reducing the flow area. The risk of flow separation at the shroud can thus be reduced without the radial component of the flow being accelerated too much on average. The surface profile in the diffuser (downstream of the compressor wheel) can be deliberately designed in such a way that the momentum exchange on the shroud side is promoted (by reducing the shroud curvature and by the pinch region formed with the hub and shroud contour) and the flow at the hub (for example upstream of the diffuser vane leading edge) is decelerated to a maximum extent. Thus, the compressor wheel outlet flow can be greatly decelerated and made more uniform within a compact installation space without the flow having a tendency for premature separation and instability during throttling.

LIST OF REFERENCE SIGNS 1 flow direction
2 axis of rotation
3 gap
4 compressor wheel outlet edge
5 inlet into the diffuser region
10 outflow region
11 flow channel 12 shroud-side side wall
13 hub-side side wall
14 region of the compressor wheel outlet
15 S-shaped contour
16 diffuser region
17 diffuser vanes
20 compressor
21 compressor wheel
$R_1$ compressor wheel inlet radius
$R_2$ compressor wheel outlet radius
$R_3$ radial distance of the inlet into the diffuser region from the axis of rotation
$R_S$ radial distance of the end of the S-shaped region from the axis of rotation in the flow direction
$S_1$, $S_2$, $S_3$, $S_4$ segments of the hub-side side wall contour

The invention claimed is:

1. An outflow region of a compressor having a flow channel which is delimited by a shroud-side side wall and a hub-side side wall, wherein, in a region of the compressor wheel outlet, the flow channel extends from a compressor wheel outlet edge to a diffuser vane inlet edge of a diffuser region, wherein the diffuser region is in fluid communication with the region of the compressor wheel outlet and has a multiplicity of diffuser vanes; and
   wherein the hub-side side wall has a S-shaped contour that includes a convex segment adjacent the compressor wheel outlet edge and a concave segment adjoining an outlet end, in a flow direction of flow from the compressor wheel outlet, of the convex segment; and
   wherein the shroud-side side wall includes a contour that is convex from the compressor wheel outlet edge to the multiplicity of diffuser vanes; and
   wherein the contours of the hub-side side wall and the shroud-side side wall are configured in such a way that, in the flow direction, the cross-sectional area of the flow channel decreases to a minimum and increases from the minimum.

2. The outflow region as claimed in claim 1, wherein at least one of the hub-side side wall and the shroud-side side wall have continuous contour profiles in the region of the compressor wheel outlet.

3. The outflow region as claimed in claim 1, wherein the S-shaped contour of the hub-side side wall is arranged closer to the compressor wheel outlet edge than to the diffuser vane inlet edge.

4. The outflow region as claimed in claim 1, wherein the flow channel has a compressor wheel outlet cross-sectional area A2 and a diffuser inlet cross-sectional area A3, wherein a ratio A3/A2 is selected from a range of $0.80 \leq A3/A2 \leq 1.2$.

5. The outflow region as claimed in claim 1, wherein a gap is formed in the hub-side side wall.

6. The outflow region as claimed in claim 1, wherein a ratio VQ of the minimum of the cross-sectional areas of the flow channel to a compressor wheel outlet cross-sectional area $A_2$ is selected from a range $0.8 \leq VQ < 1$.

7. The outflow region as claimed in claim 1, wherein the cross-sectional areas of the flow channel are the meridional cross-sectional areas of the flow channel, wherein the main flow direction runs along the center line between the shroud-side side wall and the hub-side side wall.

8. A compressor having a compressor wheel and an outflow region, the outflow region having a flow channel which is delimited by a shroud-side side wall and a hub-side side wall, wherein, in a region of the compressor wheel outlet, the flow channel extends from a compressor wheel outlet edge to a diffuser vane inlet edge of a diffuser region, wherein the diffuser region is in fluid communication with the region of the compressor wheel outlet and has a multiplicity of diffuser vanes; and
   wherein the hub-side side wall has a S-shaped contour that includes a convex segment adjacent the compressor wheel outlet edge and a concave segment adjoining an outlet end, in a flow direction of flow from the compressor wheel outlet, of the convex segment; and
   wherein the shroud-side side wall includes a contour that is convex from the compressor wheel outlet edge to the multiplicity of diffuser vanes; and
   wherein the contours of the hub-side side wall and the shroud-side side wall are configured in such a way that, in the flow direction, the cross-sectional area of the flow channel decreases to a minimum and increases from the minimum.

9. The compressor as claimed in claim 8, wherein the minimum of the cross-sectional areas of the flow channel in the flow direction lies at a radial position $r_{Min}$, which is selected from a range $R_2 < r_{Min} \leq R_2 + 0.8 \times (R_3 - R_2)$, wherein $R_2$ is a radius of the compressor wheel outlet from the axis of rotation of the compressor wheel, and wherein $R_3$ is the radial distance of an inlet into the diffuser region from the axis of rotation of the compressor wheel.

10. The compressor as claimed in claim 8, wherein the a change in curvature from the convex segment to the concave segment lies at a radial position $r_{KW}$ which is selected from a range $R_2 < r_{KW} \leq R_2 + 0.8 \times (R_3 - R_2)$, where $R_2$ is a radius of the compressor wheel outlet from the axis of rotation of the compressor wheel, and where $R_3$ is the radial distance of an inlet into the diffuser region from the axis of rotation of the compressor wheel.

11. The compressor as claimed in claim 8, wherein the convex segment has a maximum curvature at a radial position $r_{Kmax}$, which is selected from a range $R_2 < r_{Kmax} \leq R_2 + 0.75 \times (R_3 - R_2)$, and wherein the concave segment has a minimum curvature at a radial position $r_{min}$, which is selected from a range $R_2 + 0.15 \times (R_3 - R_2) \leq r_{Kmin} < R_3$, wherein $R_2$ is a radius of the compressor wheel outlet from the axis of rotation of the compressor wheel, and wherein $R_3$ is the radial distance of an inlet into the diffuser region from the axis of rotation of the compressor wheel.

12. The compressor as claimed in claim 8, wherein the compressor wheel has a compressor wheel inlet radius $R_1$ and a compressor wheel outlet radius $R_2$, wherein a ratio $R_1/R_2$ is selected from a range of $0.65 \leq R_1/R_2$.

13. The compressor as claimed in claim 8, wherein the diffuser region is arranged at a radial distance $R_3$ from an axis of rotation of the compressor wheel, wherein a ratio of the radial distance $R_3$ to a radius $R_2$ of the compressor wheel outlet from the axis of rotation of the compressor wheel is selected from a range of $1.05 \leq R_3/R_2 \leq 1.30$.

14. The compressor as claimed in claim 8, wherein the contour of the hub-side side wall comprises, in the flow direction, an end at a distance $R_S$ from the axis of rotation of the compressor wheel, and wherein Rs, a radius $R_2$ of the compressor wheel outlet from the axis of rotation of the compressor wheel, and the radial distance $R_3$ of the diffuser region from the axis of rotation of the compressor wheel are selected in such a way that the condition $0.4 \leq (R_S - R_2)/(R_3 - R_2) \leq 1.0$ is satisfied.

15. A turbocharger having a compressor and a turbine, the compressor having a compressor wheel and an outflow region, the outflow region having a flow channel which is delimited by a shroud-side side wall and a hub-side side wall, wherein, in a region of the compressor wheel outlet, the flow channel extends from a compressor wheel outlet edge to a diffuser vane inlet edge of a diffuser region, wherein the diffuser region is in fluid communication with the region of the compressor wheel outlet and has a multiplicity of diffuser vanes; and
- wherein the hub-side side wall has a S-shaped contour that includes a convex segment adjacent the compressor wheel outlet edge and a concave segment adjoining an outlet end, in a flow direction of flow from the compressor wheel outlet, of the convex segment; and
- wherein the shroud-side side wall includes a contour that is convex from the compressor wheel outlet edge to the multiplicity of diffuser vanes; and
- wherein the contours of the hub-side side wall and the shroud-side side wall are configured in such a way that, in the flow direction, the cross-sectional area of the flow channel decreases to a minimum and increases from the minimum.

* * * * *